United States Patent [19]

Ogino et al.

[11] Patent Number: 5,513,386
[45] Date of Patent: Apr. 30, 1996

[54] RECEIVER FOR A CELLULAR MOBILE RADIO COMMUNICATION SYSTEM

[75] Inventors: Tooru Ogino; Kazuya Hashimoto, both of Tokyo, Japan

[73] Assignee: NEC Corporation, Japan

[21] Appl. No.: 340,814

[22] Filed: Nov. 17, 1994

Related U.S. Application Data

[63] Continuation of Ser. No. 716,811, Jun. 17, 1991, abandoned.

[30] Foreign Application Priority Data

Jun. 16, 1990 [JP] Japan .................................. 2-158257
May 24, 1991 [JP] Japan .................................. 3-149491

[51] Int. Cl.⁶ .................................................... H04B 1/06
[52] U.S. Cl. ............................. 455/234.1; 455/241.1; 455/246.1; 455/254; 455/296; 455/33.1
[58] Field of Search ................................ 455/33.1, 33.2, 455/234.1, 234.1, 242.2, 241.2, 246.1, 249.1, 251.1, 254, 69–70, 38.1, 296; 375/98

[56] References Cited

U.S. PATENT DOCUMENTS

| | | | |
|---|---|---|---|
| 4,025,853 | 5/1977 | Addeo | 455/37.1 |
| 4,227,256 | 10/1980 | O'Keefe | 455/251.1 |
| 4,310,722 | 1/1982 | Schaible | 455/33.1 |
| 4,384,362 | 5/1983 | Leland | 455/33.1 |
| 4,393,513 | 7/1983 | Yokogawa et al. | 455/249.1 |
| 4,553,105 | 11/1985 | Sasaki | 455/249.1 |
| 4,704,738 | 11/1987 | Graziadei et al. | 455/249.1 |

FOREIGN PATENT DOCUMENTS

| | | | |
|---|---|---|---|
| 0002006 | 1/1979 | Japan | 455/249.1 |
| 0042324 | 3/1983 | Japan | 455/254 |
| 9014718 | 11/1990 | WIPO | 455/246.1 |

*Primary Examiner*—Andrew I. Faile
*Attorney, Agent, or Firm*—Ostrolenk, Faber, Gerb & Soffen

[57] ABSTRACT

A receiver for being mounted on an automobile telephone or similar mobile station which is included in a cellular mobile radio communication system. The receiver has a high frequency amplifier for amplifying a received input wave, and a mixer for converting the received input wave to an intermediate frequency. The gain of the amplifier or that of the mixer is changed on the basis of the level of the field strength of the received input wave and whether or not the mobile station is communicating with a base station. The receiver enhances the reception sensitivity characteristic at locations where the reception field strength is low or the intermodulation distortion characteristic at locations where the field strength is high and intermodulation distortions occur.

11 Claims, 8 Drawing Sheets

RECEIVER FOR A CELLULAR MOBILE RADIO COMMUNICATION SYSTEM

This is a Continuation of application Ser. No. 07/716,811 filed on Jun. 17, 1991, abandoned.

BACKGROUND OF THE INVENTION

The present invention relates to a receiver for being mounted on an automobile telephone or similar mobile station included in a cellular mobile radio communication system. More particularly, the present invention is concerned with a receiver capable of enhancing the reception sensitivity characteristic in locations where the reception field strength is low, or the intermodulation distortion characteristic in locations where the field sensitivity is high and intermodulation distortions occur.

A cellular mobile radio communication system divides a service area into minute cells and locates a base station in each of the cells. This kind of communication system allows the base stations to communicate with mobile stations such as automobile telephones while promoting effective use of frequencies. A conventional receiver for such an application has an antenna duplexer for passing, among received input waves (having various wavelenght) coming in through an antenna, only a desired wave (having a desired wavelength). A high frequency amplifier amplifies the received wave while a high frequency filter attenuates the frequencies of the received wave lying outside of a particular frequency band. A first frequency converter has a first mixer and a first local oscillator and converts the received wave passed through the high frequency filter to a first intermediate frequency (IF). The first IF is applied to an IF filter. A second frequency converter has a second mixer and a second local oscillator and converts the first IF passed through the IF to a second IF. The second IF is fed to an IF amplifier and then to a demodulator. The demodulated signal from the demodulator is amplified by a low frequency amplifier and then outputted via a loudspeaker as voice. A field strength detector monitors the reception field strength by converting the field strength of the received input wave from the antenna to a voltage. A SAT (Supervisory Audible Tone) signal detector is responsive to a SAT signal being fed from a base station for determining whether or not the mobile station is in communication with the base station.

The above-described receiver has an excellent reception sensitivity characteristic since the high frequency amplifier amplifies the received wave and since the first mixer converts it to the first IF with a high gain. However, when the desired received wave is accompanied by interference waves, the intermodulation distortion is aggravated, degrades the intermodulation characteristic.

Some different efforts have heretofore been made to reduce the intermodulation distortions and thereby improve the intermodulation characteristic. For example, the high frequency amplifier may be omitted to thereby lower the level of the interference waves entering the first mixer, or the gain of the first mixer may be reduced. However, the problem with these implementations is that the high frequency gain of the receiver is lowered, which degrades the receive sensitivity due to the omission of the high frequency amplifier or due to the lowered gain of the first mixer.

SUMMARY OF THE INVENTION

It is therefore an object of the present invention to provide a receiver for a cellular mobile radio communication system which improves both the reception sensitivity characteristic and the intermodulation characteristic at the same time.

It is another object of the present invention to provide a generally improved receiver For a cellular mobile radio communication system.

In accordance with the present invention, a receiver mounted on a mobile station which is included in a cellular mobile radio communication system for communicating with a base station comprises a high frequency amplifier for amplifying a received input wave, a field strength detector for detecting the field strength of the received input wave, a SAT signal detector for detecting a SAT signal being fed from the base station and thereby determining whether or not the mobile station is in communication with the base station, and a controller for selectively enabling or disenabling the high frequency amplifier on the basis of the level of the field strength of the received input wave detected by the field strength detector and the result of a decision produced by the SAT signal detector as to the SAT signal.

Alternatively, the controller may be for selecting a particular one of a plurality of gains of the high frequency amplifier on the basis of the level of the field strength of the received input wave and the result of a decision produced by the SAT signal detector.

Further, in accordance with the present invention, receiver mounted on a mobile station which is included in a cellular mobile radio communication system for communicating with a base station comprises a field strength detector for detecting the field strength of a received input wave, a mixer for converting the received input wave to a first intermediate frequency, and a controller for controlling the mixer for changing the gain of the mixer on the basis of the level of the field strength of the received input wave detected by the field strength detector.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
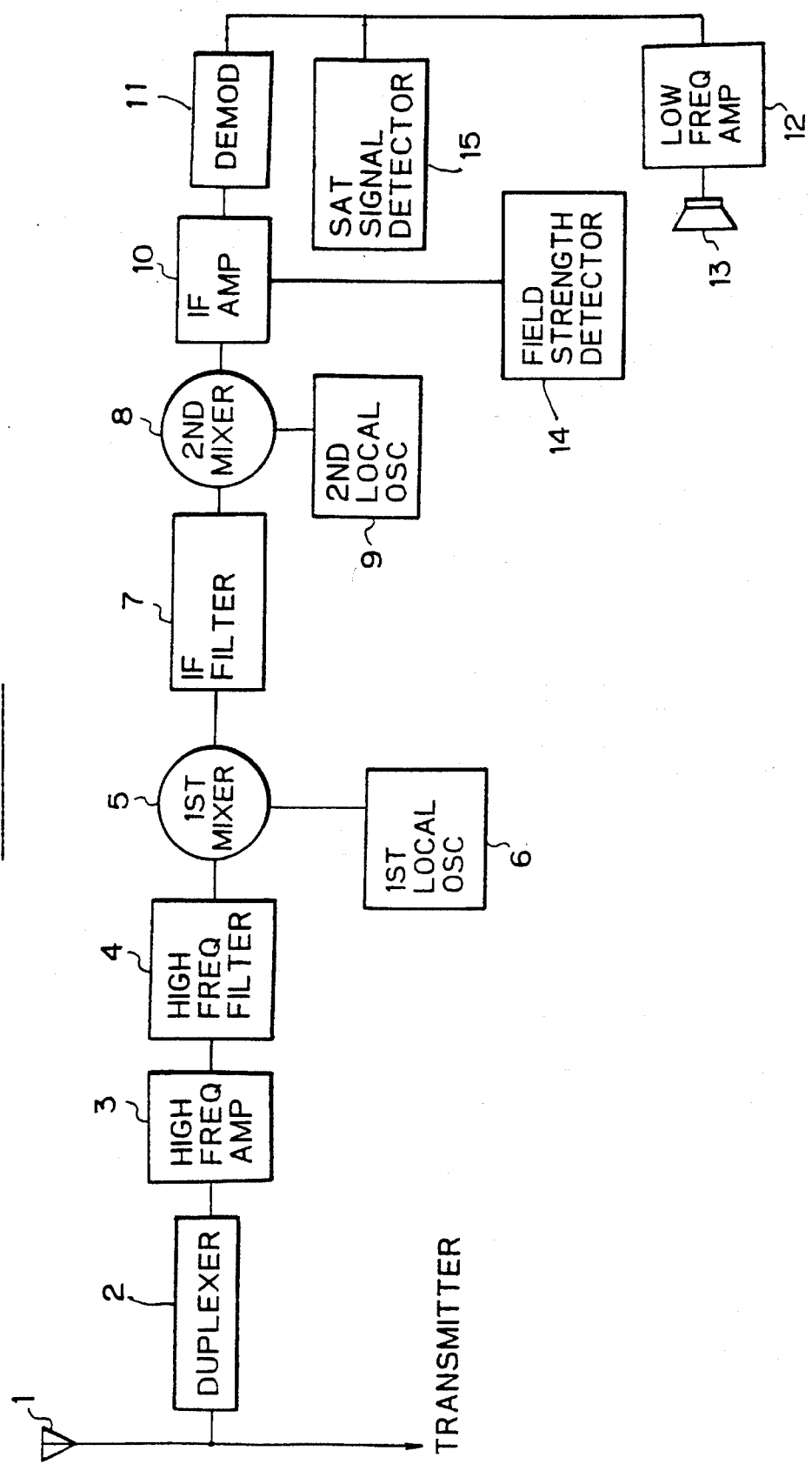
FIG. 1 is a block diagram schematically showing a conventional receiver for a cellular mobile radio communication system.

To better understand the present invention, a brief reference will be made to a conventional receiver for a cellular mobile communication system, shown in FIG. 1. As shown, electromagnetic waves coming in through an antenna 1 are applied to an antenna duplexer 2. Only the received wave included in the electromagnetic waves is passed through the duplexer 2, amplified by a high frequency amplifier 3, and then fed to a high frequency filter 4 to attenuate the frequency components outside of the reception frequency band. The received wave passed through the filter 4 is converted to a first intermediate frequency (IF) by a first mixer 5 and a first local oscillator 6 which constitute a first frequency converter in combination. The first IF is filtered by an IF filter 7 and then converted to a second IF by a second mixer 8 and a second local oscillator 9 which constitute a second frequency converter. The second IF has the gain thereof increased by an IF amplifier 10 to an operating level particular to a demodulator 11. The demodulator 11 demodulates the resulted IF. The demodulated signal is amplified by a low frequency amplifier 12 and then outputted via a loudspeaker as voice. A field strength detector 14 monitors the reception field strength by converting the field strength of received input waves to voltages. A SAT (Supervisory audible Tone) signal detector 15 is responsive to a SAT signal being sent from a base station for thereby determining whether or not the associated mobile station is in communication with the base station. For details of the SAT signal detector 15, a reference may be made to U.S. Pat. No. 4,025,853 by way of example, which is incorporated herein. The antenna 1 is connected to a transmitter, not shown, as well as to the receiver.

The above-described conventional receiver receives incoming waves with high sensitivity since the high frequency amplifier 3 amplifies the received waves and since the mixer 5 of the first frequency converter converts them to the first IF with a high gain. However, the problem is that when interference waves are received together with a desired wave, intermodulation distortions are aggravated to thereby degrade the intermodulation characteristic. This problem will be described with reference to FIGS. 2 and 3 more specifically.

Figure 2:
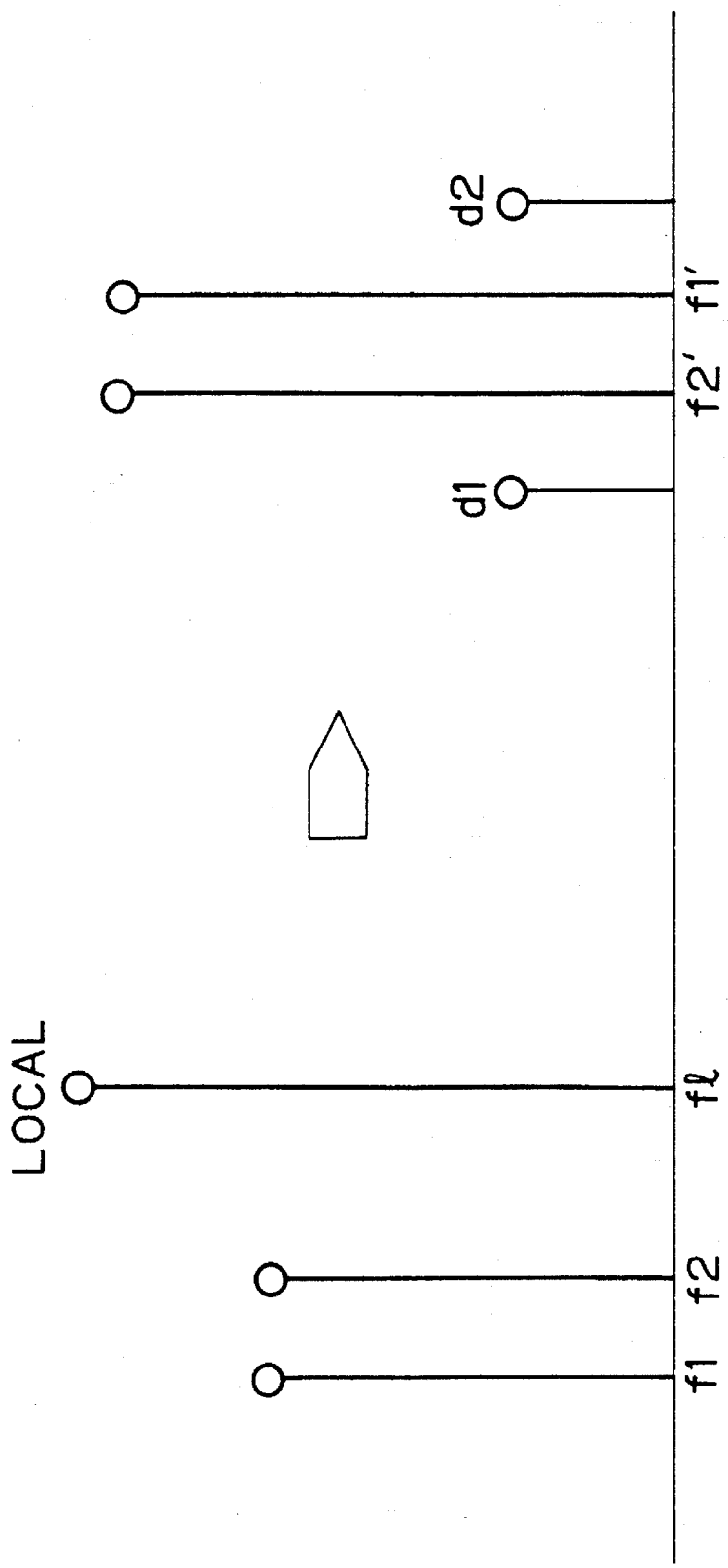
FIG. 2 shows a relation between the inputs and the outputs of a mixer included in the conventional receiver.
Figure 3:
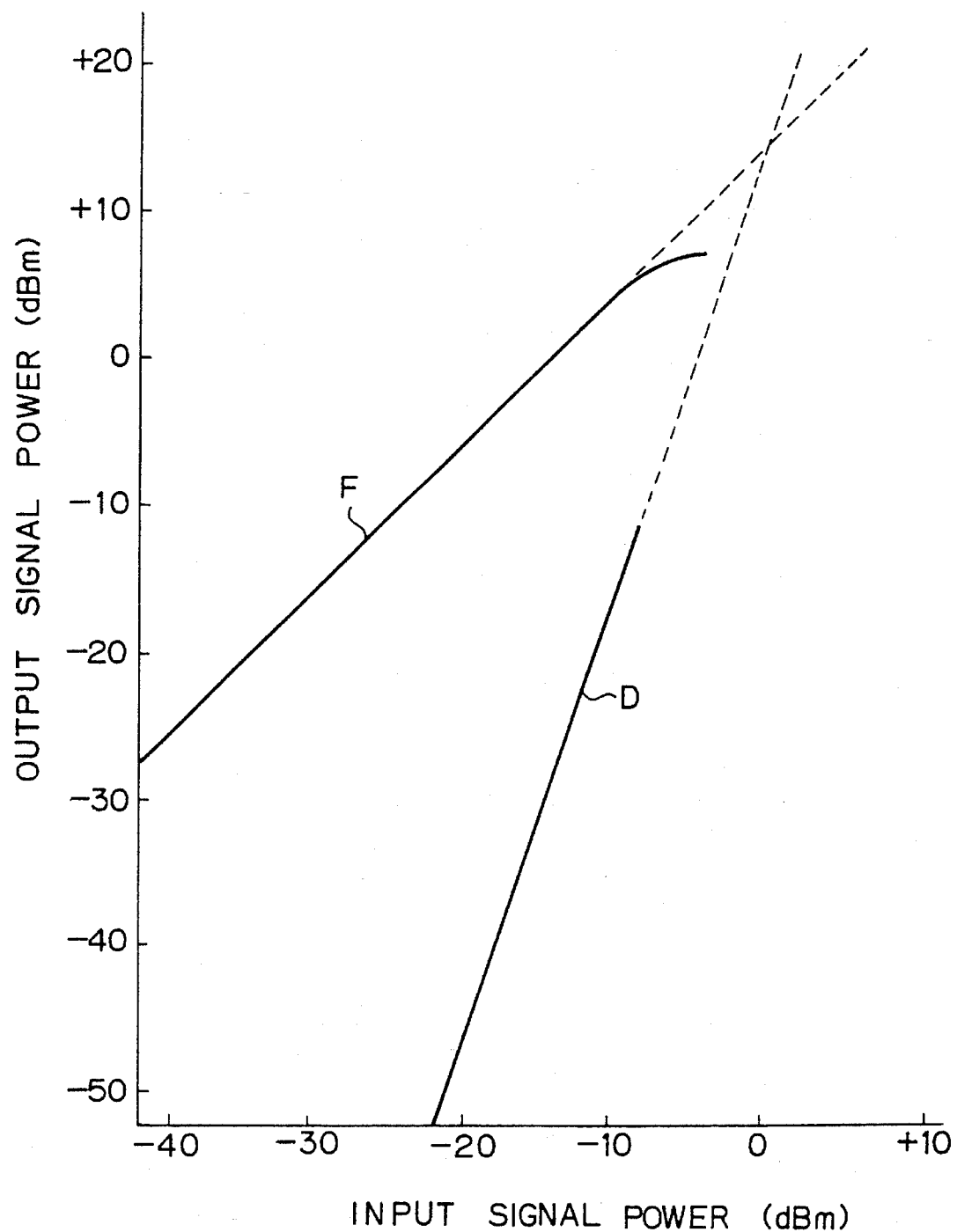
FIG. 3 is a graph showing a relation between the input signal power and the output signal power of a desired signal output and tertiary intermodulation distortion.

As shown in FIG. 2, when input signals $f_1$ and $f_2$ each having a particular frequency and a local signal $f_1$ for frequency conversion are applied to the input of the first mixer 5, the mixer 5 produces output signals $f'_1$ and $f'_2$ as desired signals. In addition, tertiary intermodulation distortions $d_1$ and $d_2$ appear on the output of the mixer 5 due to the nonlinearity of a transistor that constitutes the mixer 5. As a result, the output signal of the mixer 5, i.e., the first frequency converter includes not only the desired frequencies but also the interference frequencies, degrading the reception characteristic of the receiver. FIG. 3 shows a relation between the input signal voltage to the mixer 5 (abscissa) and the output signal power of desired signal output and tertiary intermodulation distortion (ordinate). As shown, while the desired signal output F of the mixer 5 has a gradient 1, the tertiary intermodulation distortion D has a gradient 3. Hence, when the input signal power is increased by 1 dB, the tertiary intermodulation distortion D increases by 3 dB although the desired signal output F also increases by 1 dB. Conversely, on the decrease of the input signal power by 1 dB, the tertiary intermodulation distortion D decreases by 3 dB while the desired signal output F decreases by only 1 dB. It follows that reducing the input signal power to the mixer 5 is successful in improving the intermodulation characteristic in a ratio of 1:3 so long as the received input signal has a sufficient level, i.e., the input power of the desired signal can be safely lowered.

For the above reason, it has been customary to omit the high frequency amplifier 3 to thereby reduce the input signal power to the first mixer 5 or the gain of the mixer 5. This suppresses the intermodulation distortions and thereby improves the intermodulation characteristic. However, such an implementation lowers the high frequency gain and, therefore, the reception sensitivity characteristic, as mentioned earlier.

Hereinafter will be described preferred embodiments of the present invention which improve not only the reception sensitivity characteristic but also the intermodulation characteristic.

First Embodiment

Figure 4:
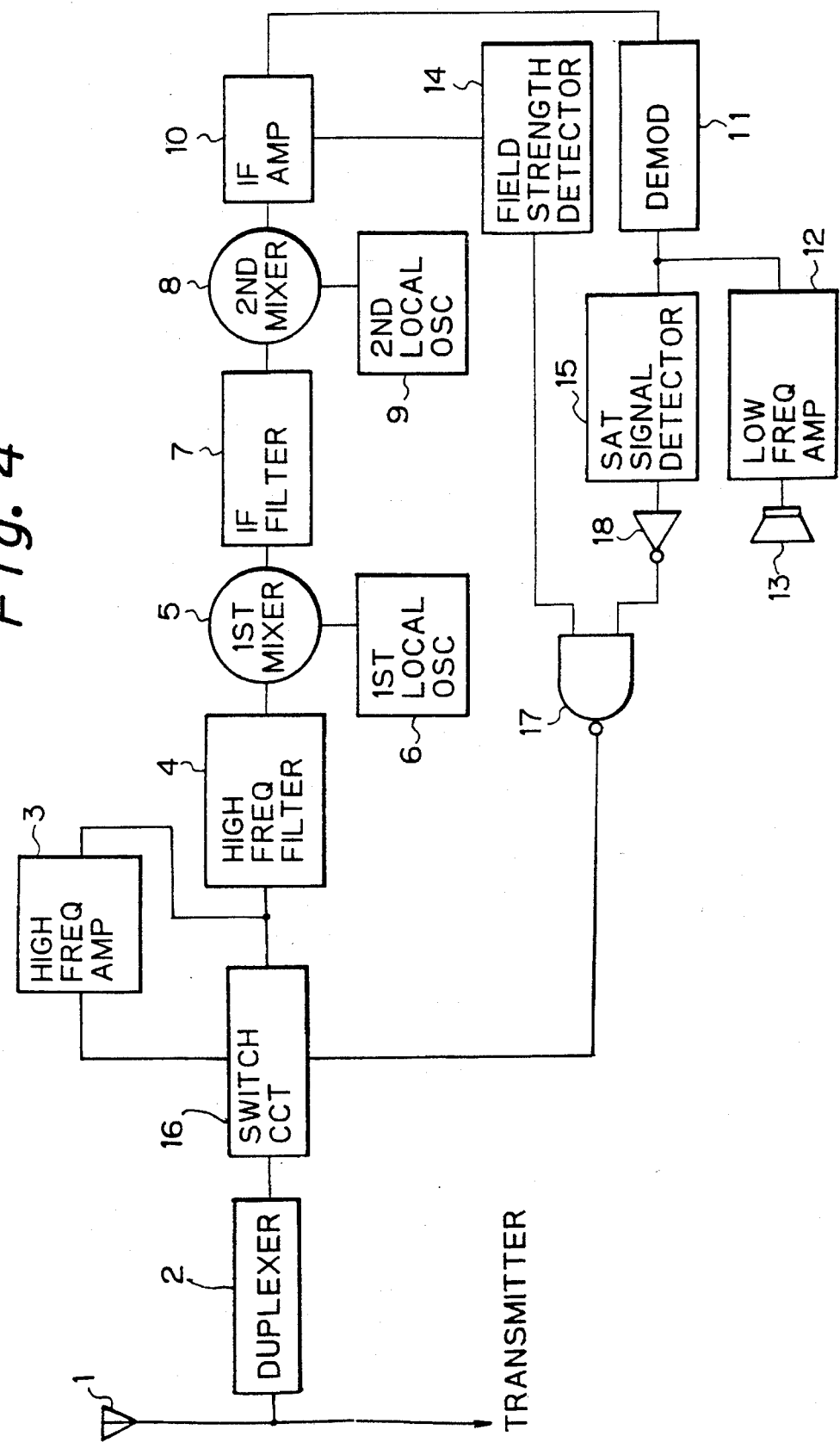
FIG. 4 is a block diagram schematically showing a first embodiment of the receiver in accordance with the present invention.

Referring to FIG. 4, a first embodiment of the present invention selectively connects and disconnects a high frequency amplifier depending on the level of a reception field strength, thereby reducing the intermodulation distortions without degrading the reception sensitivity characteristic. In FIG. 4, the same or similar components as those of the conventional receiver, FIG. 1, are designated by the same reference numerals, and redundant description will be avoided for simplicity. In FIG. 4, the receiver has a swiching circuit 16, a NAND gate 17, and a NOT gate 18 in addition to the various components of the prior art receiver shown in FIG. 1. The output of the SAT signal detector 15 is applied to the NOT gate 18 whose output is in turn fed to one input terminal of the NAND gate 17. The output of the field strength detector 14 is delivered to the other input terminal of the NAND gate 17 the output of which is in turn fed to the switching circuit 16. The output of the field strength detector 14 goes high or "H" when the detector 14 detects a reception field strength higher than a predetermined level. The output of the SAT signal detector 15 goes high when the detector 15 detects a SAT signal. When the output of the NAND gate 17 goes high, the switching circuit 16 connects the high frequency amplifier 3 to the duplexer 2 and high frequency filter 4 to allow the amplifier 3 to amplify the received signal. Conversely, when the output of the NAND gate 17 goes low or "L", the switching circuit 16 disconnects the amplifier 3 from the duplexer 2 to deliver the received signal from the duplexer 2 directly to the high frequency filter 4.

In operation, when the reception field strength is low, i.e., when the field strength of the input waves being received is determined to be low, the output of the field strength detector 14 remains in a low level or "L". The NAND gate 17, therefore, produces a high level output or "H" with no regard to the output of the SAT signal detector 15. In response, the switching circuit 16 connects the high frequency amplifier 3 to the duplexer 2 and high frequency filter 4 with the result that the received signal from the antenna 1 is applied to and amplified by the amplifier 3. In this condition, reception with high sensitivity is insured.

On the other hand, the output of the NAND gate 17 will be low if the waveform of the SAT signal has been disturbed by interference waves and has not been detected by the SAT signal detector 15, despite that the reception field strength is high. Such a condition means that an intermodulation distortion has occurred. Then, the outputs of the field strength detector 14 and SAT signal detector 15 are in a high level and a low level, respectively. The output of the SAT signal detector 15 is inverted by the NOT gate 13, and the resulted high level is applied to the NAND gate 17. As a result, the output of the NAND gate 17 goes low. The switching circuit 16, therefore, disconnects the high frequency amplifier 3 from the duplexer 2 and passes the received signal directly to the high frequency filter 4. In this manner, when interference waves come in through the antenna 1, the high frequency amplifier 3 is excluded to lower the level of the interference waves applied to the first mixer 5 by an amount corresponding to the gain of the amplifier 3. Consequently, the intermodulation distortion in the first mixer 5 is reduced to improve the intermodulation characteristic of the receiver.

Figure 5:
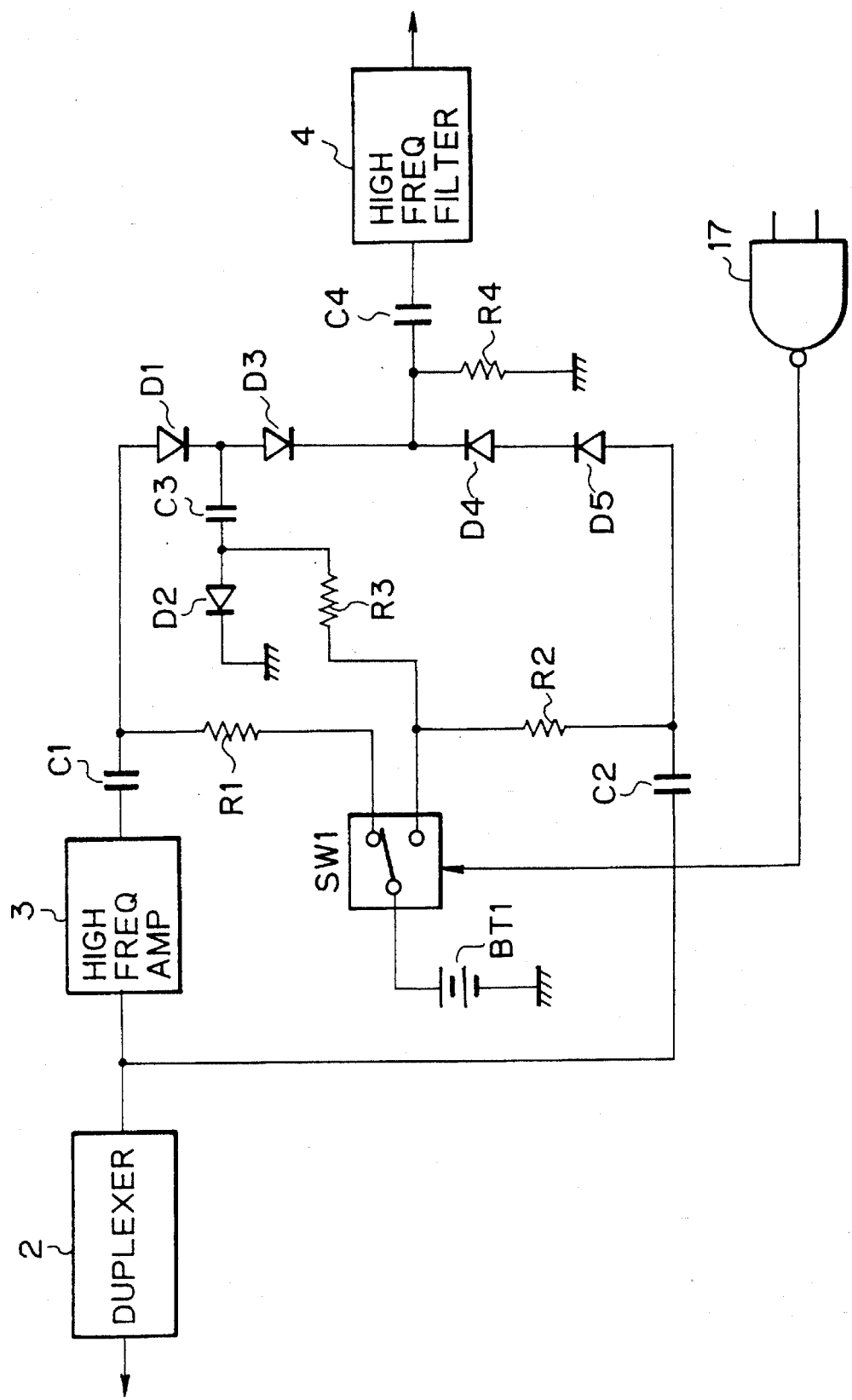
FIG. 5 is diagram showing a specific construction of a switching circuit included in the embodiment.

FIG. 5 shows a specific construction of the switching circuit 16. As shown, the switching circuit 16 has PIN diodes D1–D5 each lowering the high frequency resistance thereof in response to a current, resistors R1–R4, capacitors C1–C4, an analog switch SW1 and a power source BT1. In operation, 15 when the high level output of the NAND gate 17 is applied to the analog switch SW1, the switch SW1 connects the power source 1 to the resistor R1. Then, at current flows through the PIN diodes D1 and D2 and resistor R4. As at result, the output of the high frequency amplifier 3 is routed through the AC shut-off capacitor C1, PIN diodes D1 and D3 and DC shut-off capacitor C4 to the high frequency filter 4. At this instant, since no current flows through the PIN diodes D4 and D5, these diodes D4 and D5 maintain high resistance and, therefore, the multiplexer 2 and the high frequency filter 4 are isolated from each other with respect to high frequency. On the other hand, when the output of the NAND gate 17 goes low, the analog switch SW1 connects the power source BT1 to the resistor R2. Then, a current flows through the PIN diodes D5 and D4 and resistor R4 to lower their high frequency resistance. A current also flows through the PIN diode D2 since the voltage from the power source BT1 is also applied to the resistor RS, lowering the resistance of the diode D2. In this condition, a high frequency signal cannot pass the PIN diodes D1 and D3. The PIN diodes D1 and D3, therefore, remain in a high resistance state. As a result, the output of the high frequency amplifier 3 is prevented from reaching the high frequency filter 4 via the PIN diodes D1 and D3.

Second Embodiment

Figure 6:
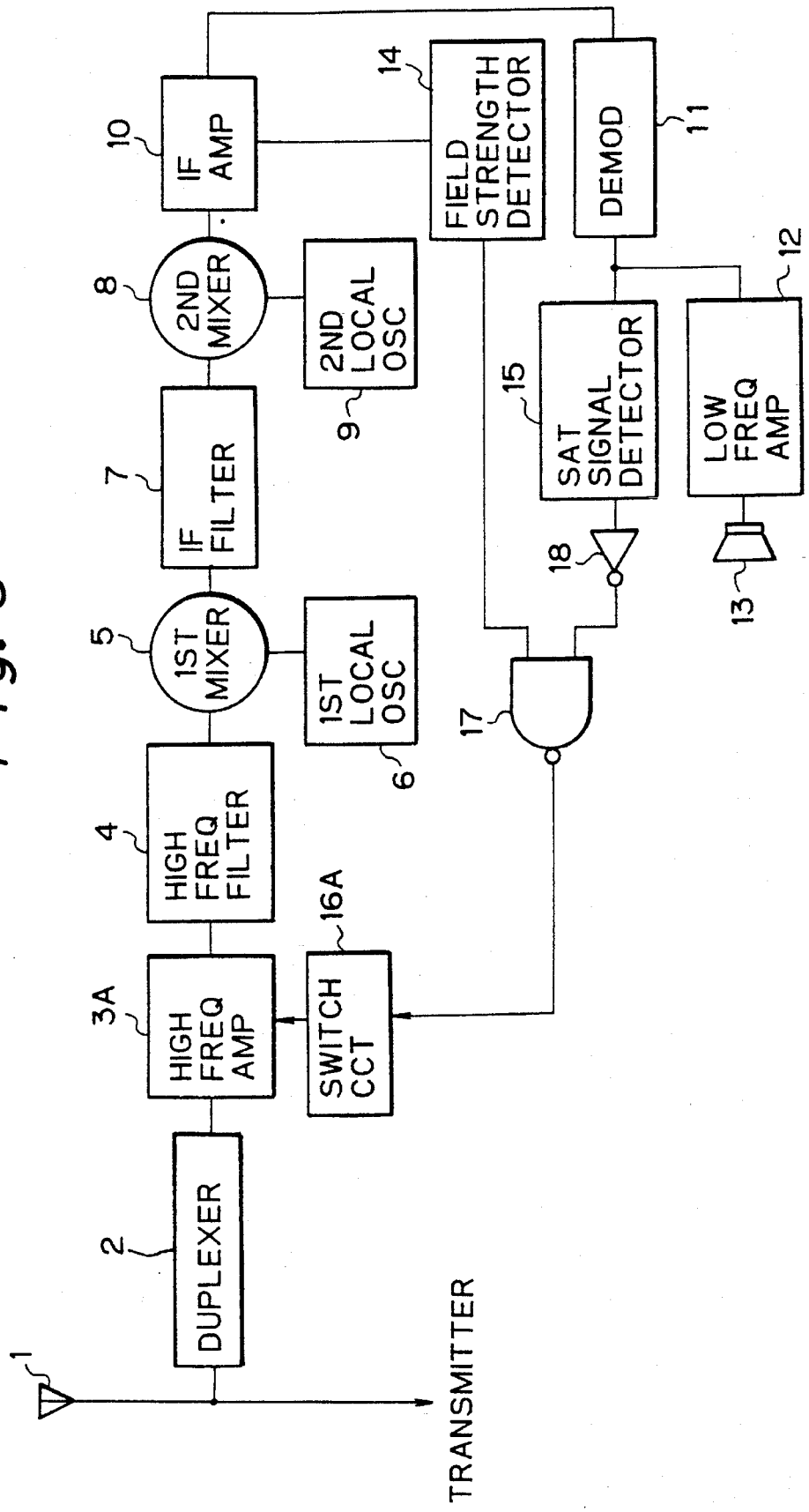
FIG. 6 is a block diagram schematically showing a second embodiment of the present invention.
Figure 7:
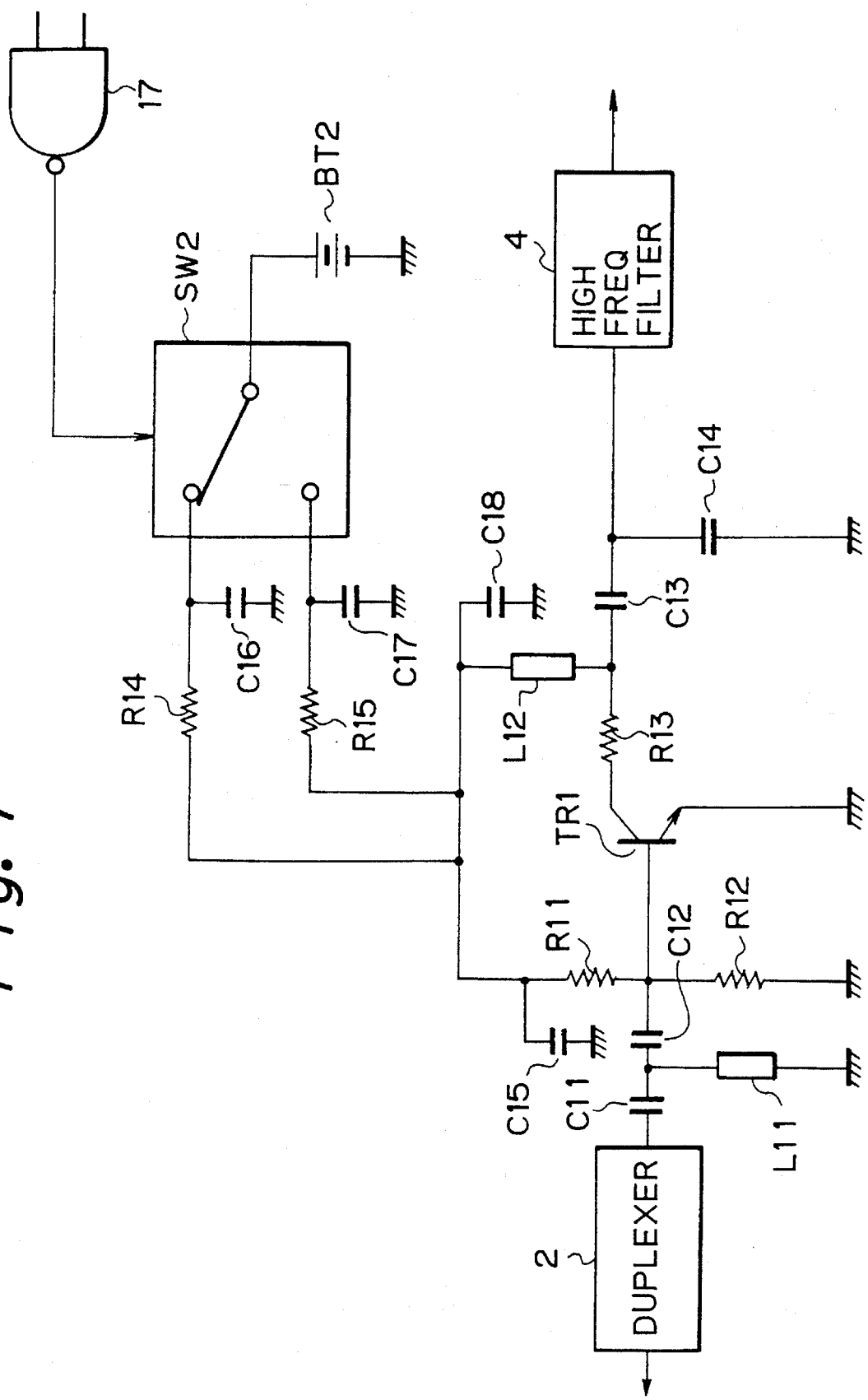
FIG. 7 is a diagram showing a specific construction of a high frequency amplifier and a switching circuit included in the second embodiment.

Referring to FIG. 6, an alternative embodiment of the present invention is shown which selectively changes the gain of the high frequency amplifier 3A for reducing intermodulation distortions. As shown, this embodiment is essentially similar to the embodiment of FIG. 4 except for the constructions of the high frequency amplifier 3A and switching circuit 16A. Specifically, as shown in FIG. 7, a high frequency amplifier 3A is made up of a transistor TR1 serving as an amplifying element, capacitors C11 and C12 and a coil L11 constituting an input impedance adjusting circuit in combination, resistors R11 and R12 constituting a base bias voltage adjusting circuit associated with the transistor TR1, a resistor R13 for interrupting the oscillation of the amplifier 3A, a coil L12 and capacitors C13 and C14 constituting an output impedance adjusting circuit, capacitors C15, C16, C17 and C18 for passing high frequencies, a power source BT2, and resistors R14 and R15 for feeding power to the transistor TR1. The resistors R14 and R15 each has a particular resistance. On the other hand, a switching circuit 16A is implemented by an analog switch SW2 inserted between the resistors R14 and R15 and the power source BT2. The gain of the transistor TR1 depends on the collector current which in turn depends on the resistance of the resistor R14 or R15. In the illustrative embodiment, the resistance of the resistor R15 is maintained higher thorn the resistance of the resistor R14, and the analog switch SW2 is driven by the output of the NAND gate 17 to connect the power source BT2 to either one of the resistors R14 and R15. Specifically, when the output of the NAND gate 17 15 coupled to the analog switch SW2 goes high, the switch SW2 connects the power source BT2 to the resistor R14 to thereby increase the gin of the transistor TR1, i.e., the gain of the amplifier 3A. On the other hand, as the output of the NAND gate 17 goes low, the analog switch SW2 connects the power source BT2 to the resistor R15. However, since the resistance of the resistor R15 is lower than that of the resistor R14, the gain of the transistor TR1, i.e., the gain of the amplifier 3A is reduced.

As stated above, this embodiment selects either one of the lower resistance resistor R14 and the higher resistance resistor and, therefore, one of the higher and lower gains of the high frequency amplifier 3A. This reduces the intermodulation distortions and thereby improves the intermodulation characteristic. The embodiment may be modified to change the gain of the amplifier 3A in thee or more steps, if desired.

Third Embodiment

Figure 8:
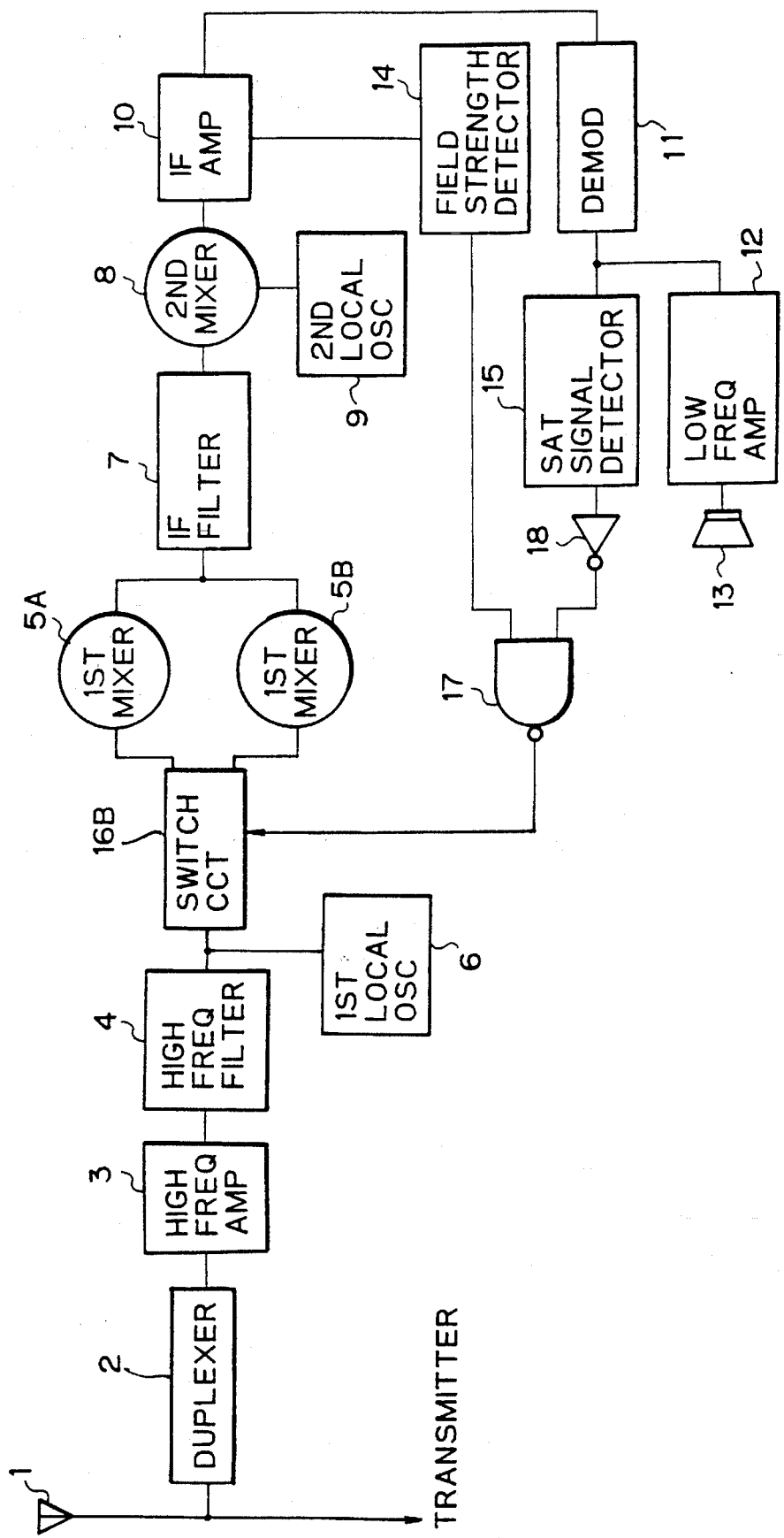
FIG. 8 is a block diagram showing a third embodiment of the present invention.

Referring to FIG. 8, another alternative embodiment of the present invention will be described. Briefly, this embodiment achieves the same objectives as the foregoing embodiments by implementing the first mixer 5 as two split mixers 5A and 5B each having a particular conversion gain and selecting either one of the by the switching circuit 16B.

As shown in FIG. 8, the receiver has a first mixer 5A, a second mixer 5B, and a switching circuit 16B for selecting either one of the mixers 5A and 5B. The first mixer 5A is constituted by a transistor mixer having a high conversion gain, while the second mixer 5B is constituted by a double balanced mixer having a desirable intermodulation characteristic although the conversion gain is low. The switching circuit 16B selectively connects either one of the mixers 5A and 5B to the high frequency filter 4 and IF filter 7 in response to the output of the NAND gate 17. In operation, when the output of the NAND gate 17 goes high, the switching circuit 16B selects the mixer 5A having a high gain. When the output of the NAND gate 17 goes low, the switching circuit 16B selects the other mixer 5B whose gain is low. Therefore, when the reception field strength is lower than a predetermined value, the mixer 5A having a high gain is used to prevent the sensitivity characteristic, rather than the intermodulation characteristic, from being lowered. On the other hand, when the field strength is higher than the predetermined value and, at the same time, an intermodulation distortion has occurred, the mixer 5B having a desirable intermodulation characteristic is used to improve the intermodulation characteristic.

This embodiment may be modified such that the switching circuit 16B selects either one of the mixers 5A and 5B on the basis of the output of the field strength detector 14 only, i.e., without referencing the output of the SAT signal detector 15.

In summary, it will be seen that the present invention provides a receiver for a cellular mobile radio communication system which enhances the sensitivity characteristic in locations where the reception field strength is low or the intermodulation characteristic in locations where the field intensity is high and intermodulation distortion occurs. The receiver, therefore, achieves an unprecedented reception characteristic.

Various modifications will become possible for those skilled in the art after receiving the teachings of the present disclosure without departing from the scope thereof.

What is claimed is:

1. A receiver for being mounted on a mobile station which is included in a cellular mobile radio communication system for communicating with a base station, comprising:

high frequency amplifying means for amplifying a received input signal and an interference signal received along with the input signal;

mixer means for converting said received input signal to a desired intermediate frequency (IF) signal and for converting said interference signal to an intermodulation product;

field strength detecting means for detecting a field strength based on a signal derived from said received input signal;

SAT (Supervisory Audible Tone) signal detecting means for detecting a SAT signal being fed from said base station and thereby determining whether or not said mobile station is in communication with said base station; and control means for selectively enabling or disabling said high frequency amplifying means on the basis of a level of the field strength detected by said field strength detecting means and on the basis of a decision signal produced by said SAT signal detecting means in response to the SAT signal;

wherein said control means enables said high frequency amplifying means when the field strength is lower than a predetermined level regardless of said decision signal, for amplifying both said received input signal and said interference signal, thereby relatively enhancing said intermodulation product in relation to said desired intermediate frequency signal; and wherein said control mans disables said high frequency amplifying means when the field strength is higher than said predetermined level and the SAT signal is not detected, thereby relatively reducing said intermodulation product in relation to said desired intermediate frequency signal.

2. A receiver as claimed in claim 1, wherein said control means comprises switching means for selectively causing said received input signal to reach said high frequency amplifying means or to bypass said high frequency amplifying means.

3. A receiver as claimed in claim 1, further comprising logical means for receiving the output of said field strength detecting means at one input terminal thereof and the output of said SAT signal detecting means at another input terminal thereof.

4. A receiver for being mounted on a mobile station which is included in a cellular mobile radio communication system for communicating with a base station, comprising:

high frequency amplifying means for amplifying a received input signal and outputting a desired signal based on said input signal as well as an intermodulation product based on an interference signal received along with the input signal;

field strength detecting means for detecting a field strength based on a signal derived from said received input signal;

SAT signal detecting means for detecting a SAT signal being fed from said base station and thereby determining whether or not said mobile station is in communication with said base station; and control means for selecting a particular one of a plurality of gains of said high frequency amplifying means on the basis of a level of the field strength detected by said field strength detecting means and on the basis of a decision signal produced by said SAT signal detecting means in response to the SAT signal;

wherein said control means selects a higher one of said plurality of gains when the field strength is lower than a predetermined level regardless of said decision signal, for amplifying both said input signal and said interference signal, thereby relatively enhancing said intermodulation product in relation to said desired signal; and wherein said control means selects a lower one of said plurality of gains when the field strength is higher than said predetermined level and the SAT signal is not detected, thereby relatively reducing said intermodulation product in relation to said desired signal.

5. A receiver as claimed in claim 4, further comprising logical means for receiving the output of said field strength detecting means at one input terminal thereof and the output of said SAT signal detecting means at another input terminal thereof.

6. A receiver for being mounted on a mobile station which is included in a cellular mobile radio communication system for communicating with a base station, comprising:

field strength detecting means for detecting a field strength based on a signal derived from a received input signal;

SAT signal detecting means for detecting a SAT signal being fed from said base station and thereby determining whether or not said mobile station is in communication with said base station;

mixer means for converting said received input signal to a first intermediate frequency signal and for converting an interference signal received along with the input signal to an intermodulation product; and control means for controlling said mixer means for changing a gain of said mixer means on the basis of the level of the field strength detected by said field strength detecting means and on the basis of a decision signal produced by said SAT signal detecting means in response to the SAT signal;

wherein said control means increases said gain when the field strength is lower than a predetermined level regardless of said decision signal, for amplifying both said input signal and said interference signal, thereby relatively enhancing said intermodulation product in relation to said first intermediate frequency signal; and wherein said control means reduces said gain when the field strength is higher than said predetermined level and the SAT signal is not detected, thereby relatively reducing said intermodulation product in relation to said first intermediate frequency signal.

7. A receiver as claimed in claim 6 wherein said mixer means comprises a first mixer having a high gain and a second mixer having a low gain.

8. A receiver as claimed in claim 7, wherein said control means comprises switching means for selecting said first mixer when the field strength is lower than said predetermined level or said second mixer when said field strength is higher than said predetermined level.

9. A receiver as claimed in claim 6, wherein said SAT signal detecting means is responsive to a signal derived from said first intermediate frequency signal for detecting said SAT signal.

10. A receiver as claimed in claim 9, wherein said mixer means comprises a first mixer having a high gain and a second mixer having a lower gain.

11. A receiver as claimed in claim 10, wherein said control means comprises switching means which selects said first mixer when the field strength is lower than said predetermined level or said second mixer when said field strength is higher than said predetermined level and the SAT signal is not detected.

* * * * *